(12) United States Patent
Sun et al.

(10) Patent No.: US 8,135,283 B2
(45) Date of Patent: Mar. 13, 2012

(54) CLOCK RECOVERY WITH CHANNEL COEFFICIENTS

(75) Inventors: Han Sun, Kanata (CA); Kuang Tsan Wu, Kanata (CA); Kim B. Roberts, Nepean (CA)

(73) Assignee: Ciena Corporation, Linthicum, MD (US)

( * ) Notice: Subject to any disclaimer, the term of this patent is extended or adjusted under 35 U.S.C. 154(b) by 427 days.

(21) Appl. No.: 12/419,368

(22) Filed: Apr. 7, 2009

(65) Prior Publication Data

US 2010/0254702 A1 Oct. 7, 2010

(51) Int. Cl.
H04B 10/00 (2006.01)
(52) U.S. Cl. .................. 398/152; 398/155; 398/154
(58) Field of Classification Search .............. 398/25
See application file for complete search history.

(56) References Cited

U.S. PATENT DOCUMENTS

| | | | |
|---|---|---|---|
| 6,411,415 B1 | 6/2002 | Smets et al. | |
| 7,076,169 B2 | 7/2006 | Shpantzer et al. | |
| 7,158,727 B2 | 1/2007 | Pathak et al. | |
| 7,532,822 B2 | 5/2009 | Sun et al. | |
| 7,555,227 B2 * | 6/2009 | Bontu et al. | 398/202 |
| 7,627,252 B2 | 12/2009 | Sun et al. | |
| 2006/0285854 A1 | 12/2006 | Sun et al. | |
| 2006/0285855 A1 | 12/2006 | Sun et al. | |
| 2007/0092260 A1 * | 4/2007 | Bontu et al. | 398/152 |
| 2009/0148164 A1 * | 6/2009 | Roberts et al. | 398/65 |

OTHER PUBLICATIONS

International Search Report mailed Jul. 30, 2010 on applicant's corresponding International PCT Application No. PCT/CA2010/000461 filed Apr. 1, 2010.

* cited by examiner

*Primary Examiner* — Kenneth N Vanderpuye
*Assistant Examiner* — Abbas H Alagheband
(74) *Attorney, Agent, or Firm* — Kent Daniels; Blake, Cassels & Graydon LLP

(57) ABSTRACT

In a coherent optical receiver of an optical communications network, a method of recovering a clock signal from a high speed optical signal received through an optical link. A set of compensation vectors are adaptively computed for compensating Inter-symbol Interference (ISI) due to at least polarization impairments of the optical signal. A channel delay is estimated based on the computed compensation vectors. The estimated channel delay is subtracted from the computed compensation vectors to generate corresponding modified compensation vectors. Finally, the modified compensation vectors are used to derive a recovered clock signal.

8 Claims, 5 Drawing Sheets

CLOCK RECOVERY WITH CHANNEL COEFFICIENTS

CROSS-REFERENCE TO RELATED APPLICATIONS

This is the first application filed in respect of the present invention.

MICROFICHE APPENDIX

Not Applicable.

TECHNICAL FIELD

The present invention relates to clock recovery in optical communications systems, and more particularly to clock recovery with channel coefficients.

BACKGROUND OF THE INVENTION

In high-speed optical communications networks, optical signals received through an optical fiber link suffer inter-symbol interference (ISI) due to, among other things, chromatic dispersion (CD) and polarization mode dispersion (PMD). In the presence of severe inter-symbol interference (ISI), clock recovery using conventional clock phase detector algorithms can fail. For example for the optical channel, chromatic dispersion (CD) and polarization mode dispersion (PMD) can dramatically reduce the clock phase sensitivity such that the phase lock condition is lost. An approach for deriving clock phase after signal equalization (e.g. for distortion compensation) is known from K. H. Mueller and M. Muller, "Timing Recovery in Digital Synchronous Data Receivers," IEEE Trans. Comm., Vol. COM-24, No. 5, May 1976.

FIG. 1 illustrates a coherent optical receiver known, for example, from Applicant's co-pending U.S. patent application Ser. No. 11/551,367 filed Oct. 20, 2006, and U.S. patent application Ser. Nos. 11/315,342 and 11/315,345, both of which were filed Dec. 23, 2005. The entire contents of U.S. patent application Ser. Nos. 11/551,367, 11/315,342 and 11/315,345 are incorporated herein by reference.

As may be seen in FIG. 1, an inbound optical signal is received through an optical link 2, split into orthogonal received polarizations by a Polarization Beam Splitter 4, and then mixed with a Local Oscillator (LO) signal 6 by a conventional 90° optical hybrid 8. The composite optical signals emerging from the optical hybrid 8 are supplied to respective photodetectors 10, which generate corresponding analog electrical signals. The photodetector signals are sampled by respective Analog-to-Digital (A/D) converters 12 to yield raw multi-bit digital signals $I_X$, $Q_X$ and $I_Y$, $Q_Y$ corresponding to In-phase (I) and Quadrature (Q) components of each of the received polarizations.

From the A/D converter 12 block, the respective n-bit signals $I_X$, $Q_X$ and $I_Y$, $Q_Y$ of each received polarization are supplied to an agile signal equalizer 14 which operates to compensate chromatic dispersion and polarization rotation impairments. In general, the signal equalizer 14 comprises a respective dispersion compensation block 16 for each of the X- and Y-polarizations, and a polarization compensation block 18. The dispersion compensation blocks 16 have a width sufficient to enable compensation of moderate-to-severe dispersion (e.g. on the order of 10000 ps/nm) based on a set of dispersion compensation coefficients 20, and generate respective intermediate vectors $\{T^A_X\}$ and $\{T^A_Y\}$. These intermediate vectors $\{T^A_X\}$ and $\{T^A_Y\}$ are then input to the polarization compensation block 18, which uses a set of polarization compensation vectors $H_{XX}$, $H_{XY}$, $H_{YY}$ and $H_{YX}$ to impose a phase rotation which compensates polarization impairments of the optical signal, and so de-convolve the transmitted symbols from the raw digital sample streams $I_X$, $Q_X$, and $I_Y$, $Q_Y$ generated by the A/D converters 12. The compensated signals 22 output from the equalizer 14 represent multi-bit estimates X'(n) and Y'(n) of the symbols encoded on each transmitted polarization of the received optical signal. These symbol estimates 22 X'(n), Y'(n), are supplied to a carrier recovery block 24 for LO frequency control, symbol detection and data recovery, such as described in Applicant's co-pending U.S. patent application Ser. No. 11/366,392 filed Mar. 2, 2006.

As shown in FIG. 1, a Least Mean Squares (LMS) update block 26 computes the polarization compensation vectors $H_{XX}$, $H_{XY}$, $H_{YY}$ and $H_{YX}$ based on the intermediate vectors $\{T^A_X\}$ and $\{T^A_Y\}$, as well as symbol phase and error information received from the carrier recovery block 24. As described in Applicant's co-pending U.S. patent application Ser. No. 11/551,367, the polarization compensation vectors $H_{XX}$, $H_{XY}$, $H_{YY}$ and $H_{YX}$ are updated at a sufficiently high rate to enable tracking, and therefore compensation, of polarization rotation transients at speeds on the order of 50 kHz.

In the receiver of FIG. 1, clock recovery can be performed as described in Applicant's co-pending U.S. patent application Ser. Nos. 11/315,342 and 11/315,345. Thus, with reference to FIG. 2, respective Upper Side Band (USB) and Lower Side Band (LSB) signals for each polarization are tapped from the output of the dispersion compensators 16 (i.e. the intermediate vectors $\{T^A_X\}$ and $\{T^A_Y\}$) and supplied to a clock recovery circuit 28 comprising an optimization block 30, a phase detector 32, loop filter 34 and an Voltage controlled Oscillator (VCO) 36. The optimization block 30 implements a polarization compensation function, based on a set of filter coefficients. In the systems of U.S. patent application Ser. Nos. 11/315,342 and 11/315,345, these filter coefficients are angle θ(n+1) and phase φ(n+1) filter coefficients generated by a coefficient calculator (not shown). However, because both the optimization block 28 and the polarization compensator 18 perform similar functions, the polarization compensation vectors $H_{XX}$, $H_{XY}$, $H_{YY}$ and $H_{YX}$ computed by the LMS update block 26 can be used for this purpose, as shown in FIG. 2. The signal appearing at the output of the optimization block 30 is then supplied to the clock phase detector 32 and the phase detection result is passed to the loop filter 34, which supplies respective control signals to coarse (C) and fine (F) tuning ports of the voltage controlled Oscillator (VCO) 36. The output of the VCO 36 is used to drive the A/D converters 12, signal equalizer 14 and the carrier recovery block 22. As described in Applicant's co-pending U.S. patent application Ser. Nos. 11/315,342 and 11/315,345, the phase detector 32 also generates a lock detection function $f(\theta_p, \phi_p)$, which can be used to detect a signal lock condition.

As may be appreciated, the signal path from the A/D converters 12, through the clock recovery circuit 28 and back to the A/D converters 12 defines a digital Phase Locked Loop (PLL) which tunes the VCO output to phase and frequency match symbols modulated onto the received optical signal. Similarly, the signal path from the dispersion compensators 16, through the polarization compensator 18, the carrier recovery block 24, LMS update block 26 and back to the polarization compensator 18 forms an equalizer adaptation loop which adaptively optimizes the compensation vectors $H_{XX}$, $H_{XY}$, $H_{YY}$ and $H_{YX}$.

The coherent optical receiver of FIGS. 1 and 2 is capable of digital clock recovery from a high-speed (e.g. symbol rates above 10 Gbaud) optical signal composed of two independently modulated orthogonal polarizations, even in the presence of moderate to severe ISI due to chromatic dispersion (CD) and polarization mode dispersion (PMD), and polarization transients on the order of 50 kHz.

As noted above, because both the polarization compensator 18 and the optimization block 30 perform similar functions, the compensation vectors $H_{XX}$, $H_{XY}$, $H_{YY}$ and $H_{YX}$ computed by the LMS update block 26 can be used for both signal equalization and clock phase detection. This arrangement in beneficial in that it eliminates the need for separate angle θ(n+1) and phase φ(n+1) filter coefficient computation blocks, and therefore reduces the cost of the receiver. However, this arrangement suffers a limitation in that the equalizer adaptation loop can interact with the clock recovery PLL to yield a double nested loop. In some cases, this interaction can lead to a random walk behaviour of the compensation vectors $H_{XX}$, $H_{XY}$, $H_{YY}$ and $H_{YX}$ and the VCO clock phase. Over time, this random walk behaviour can drive the clock phase to one side of the eye opening and thereby severely limit the ability of the equalizer 14 to compensate ISI. In extreme cases, this can lead to severe performance penalties or even system breakdown.

Accordingly, techniques for separating adaptation and clock recovery loops are highly desirable.

SUMMARY OF THE INVENTION

An aspect of the present invention provides, in a coherent optical receiver of an optical communications network, a method of recovering a clock signal from a high speed optical signal received through an optical link. A set of compensation vectors are adaptively computed for compensating Inter-symbol Interference (ISI) due to at least polarization impairments of the optical signal. A channel delay is estimated based on the computed compensation vectors. The estimated channel delay is subtracted from the computed compensation vectors to generate corresponding modified compensation vectors. Finally, the modified compensation vectors are used to derive a recovered clock signal.

An advantage of the present invention is that the equalizer adaptation loop can continue to be used for both signal equalization and clock recovery functions. However, while the equalizer adaptation loop compensates ISI due to both polarization effects (PMD and polarization rotation) and channel delay, the clock recovery PLL operates on signals that are compensated for ISI other than channel delay. This effectively separates the equalizer adaptation loop from the clock recovery PLL and thereby prevents undesirable interaction between these two functions.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method and system for separating the equalizer adaptation loop from the clock recovery PLL, by removing effects of channel delay from the clock recovery PLL. A representative embodiment of the present invention is described below with reference to FIGS. 3-8.

Figure 1:
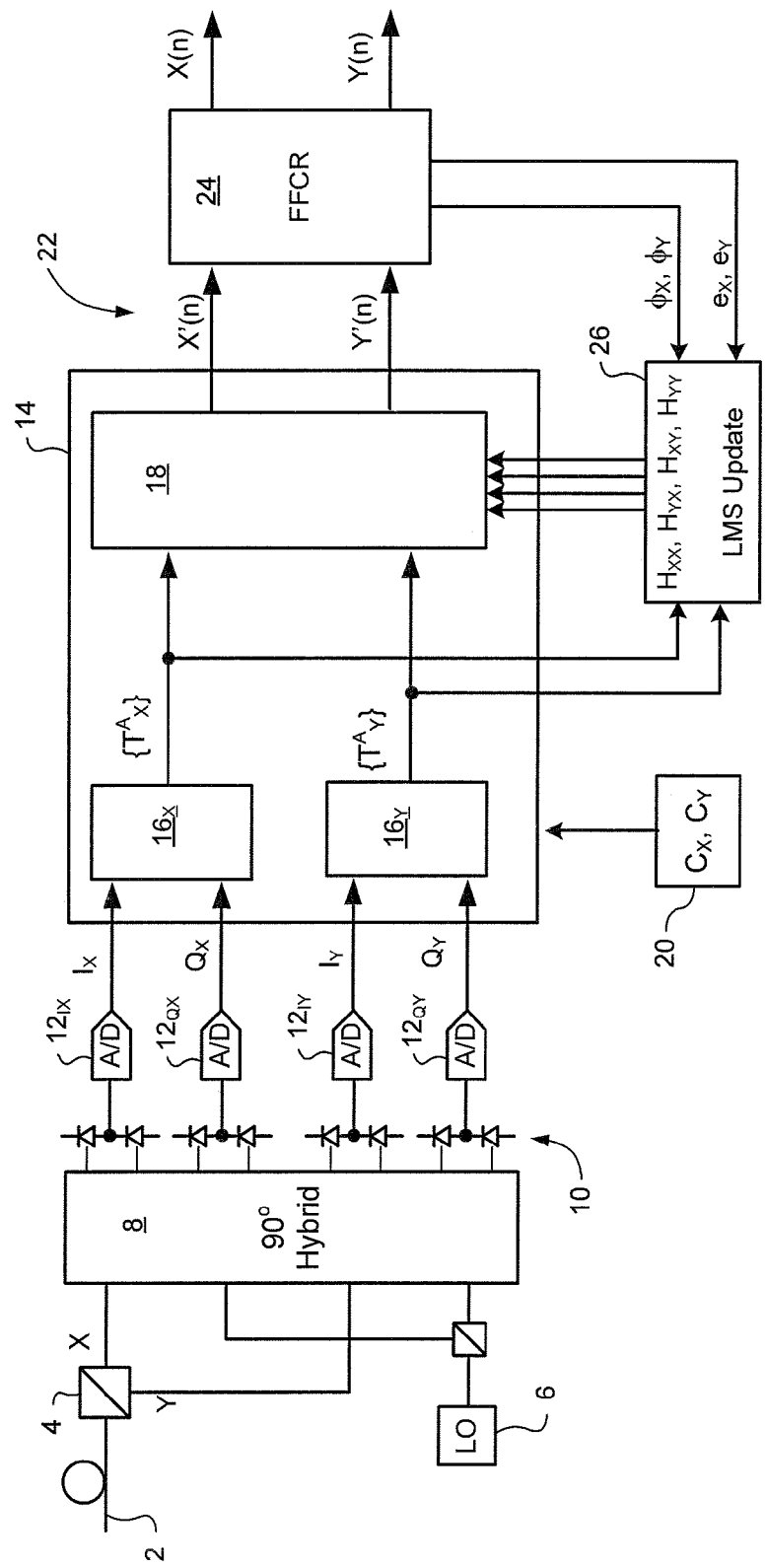
FIG. 1 is a block diagram schematically illustrating a coherent optical receiver known from Applicant's co-pending U.S. patent application Ser. No. 11/551,367.
Figure 2:
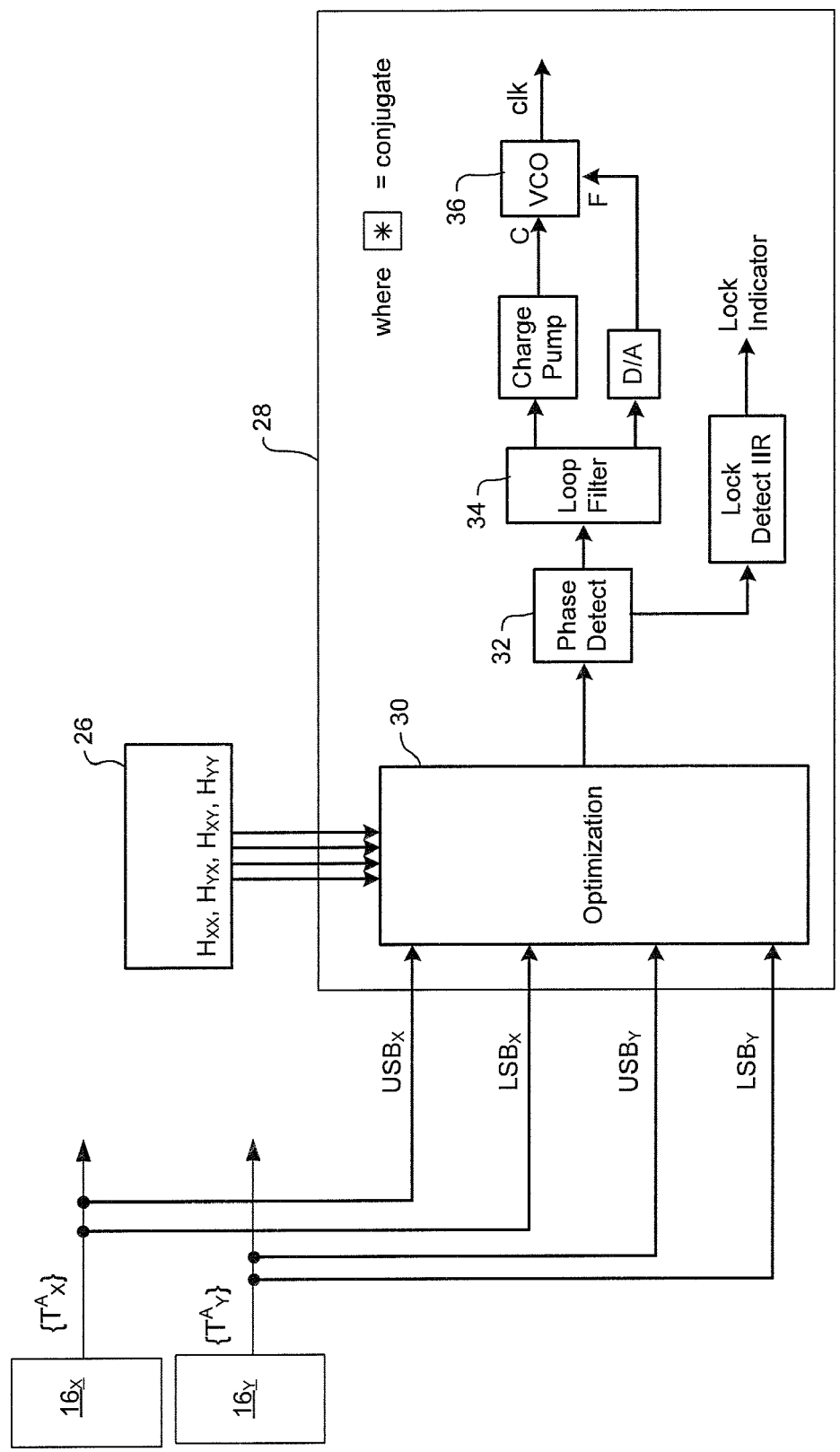
FIG. 2 is a block diagram schematically illustrating a clock recovery circuit usable in the coherent receiver of FIG. 1, and implementing methods known from Applicant's co-pending U.S. patent application Ser. Nos. 11/315,342 and 11/315,345.
Figure 3:
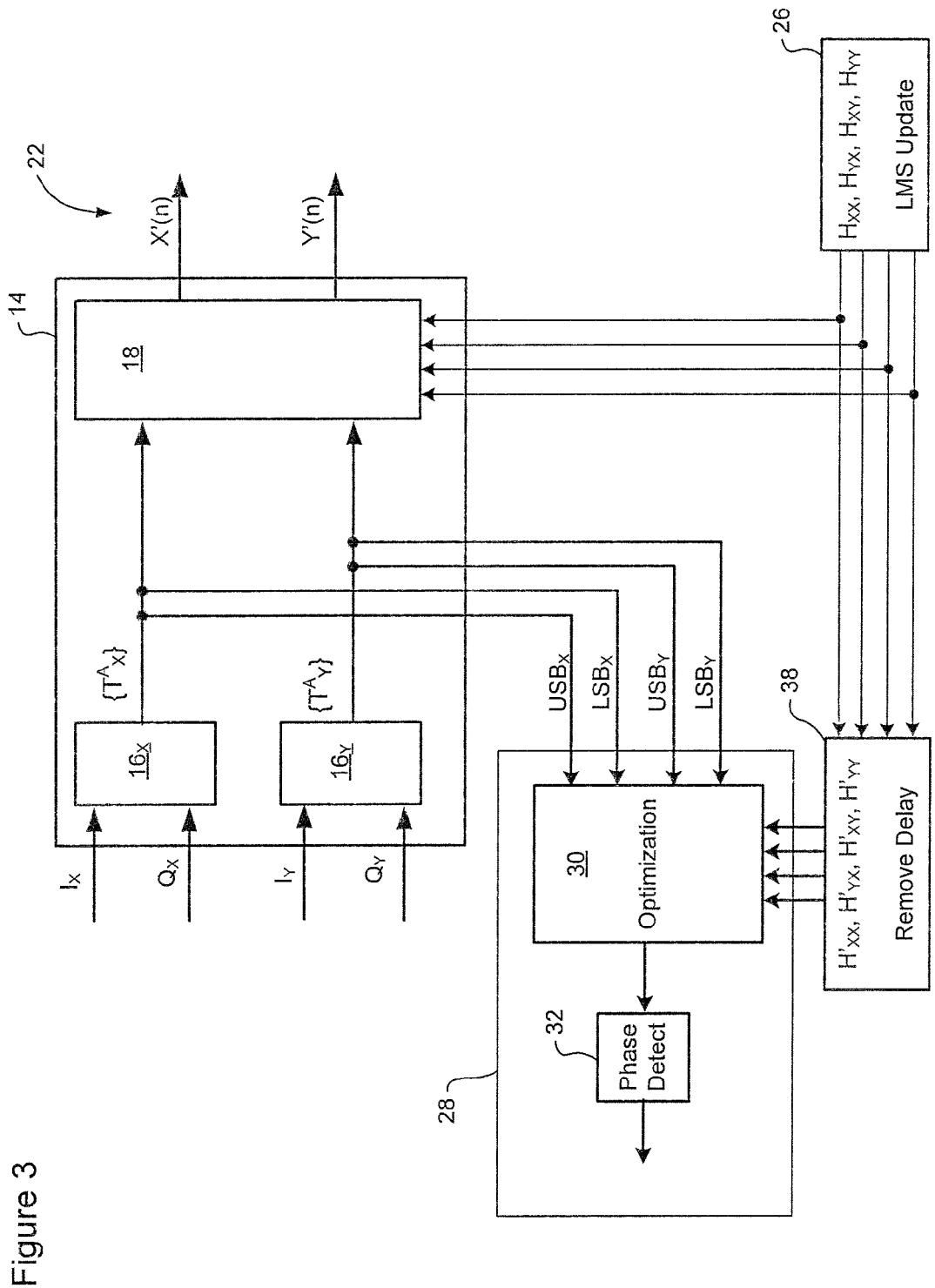
FIG. 3 is a block diagram schematically illustrating channel coefficient calculation in accordance with a representative embodiment of the present invention.

Referring to FIG. 3, there is shown a delay removal block 38 which estimates and subtracts the channel delay from the set of complex compensation vectors (Hxx, Hxy, Hyy, Hyx). The resulting modified compensation vectors (H'xx, H'xy, H'yy, H'yx) can then be supplied to the optimization block 30 of the clock recovery circuit 28. The original compensation vectors (Hxx, Hxy, Hyy, Hyx) are supplied to the polarization compensator 18 in a normal manner.

Figure 4:
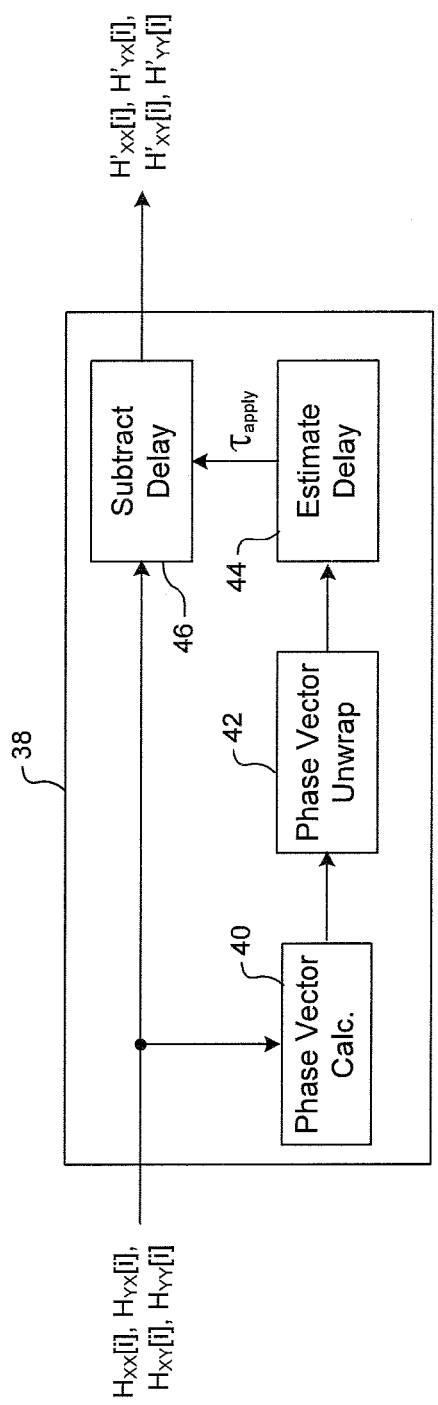
FIG. 4 is a block diagram schematically illustrating principle operations of the delay removal block of the embodiment of FIG. 3.

Referring to FIG. 4, the delay removal block 38 operates by processing the compensation vectors (Hxx, Hxy, Hyy, Hyx) to compute channel phase information (at 40). The channel phase information is then "unwrapped" (at 42) to facilitate estimation of the channel delay (at 44). The estimated channel delay is then subtracted from the compensation vectors (Hxx, Hxy, Hyy, Hyx), at 46, to yield the modified compensation vectors (H'xx, H'xy, H'yy, H'yx). Each of these functions are described in greater detail below with reference to FIGS. 5-8.

As may be appreciated, each compensation vector is composed of a respective term for each term of the intermediate vectors $\{T^A_X\}$ and $\{T^A_Y\}$. Thus, in an embodiment in which each intermediate vector $\{T^A_X\}$ and $\{T^A_Y\}$ comprises N=256 terms, each compensation vector will also include N=256 terms. For convenience, each term of a compensation vector may be referred to as an equalization coefficient, and referenced with an index [i], where i=0 . . . (N−1). A set of corresponding equalizing coefficients (Hxx[i], Hxy[i], Hyy[i], Hyx[i]) define a transfer function for equalizing the i$^{th}$ terms of the intermediate vectors $\{T^A_X\}$ and $\{T^A_Y\}$. In matrix notation, the transfer function may be written as:

$$\begin{bmatrix} H_{xx}[i] & H_{yx}[i] \\ H_{xy}[i] & H_{yy}[i] \end{bmatrix}$$

Figure 5:
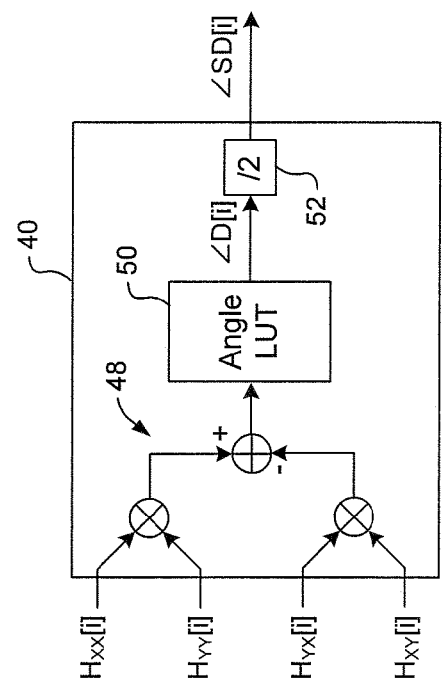
FIG. 5 is a block diagram schematically illustrating principle operations of the phase vector calculation block of FIG. 4.

The channel delay compensated by this set of coefficients cannot be obtained from any one of the four coefficients, hence traditional delay estimate methods do not apply. Instead, the channel delay is calculated from the determinant of this matrix transfer function, as shown in FIG. 5. The determinant D[i] is defined as:

$$D[i]=H_{xx}[i] \cdot H_{yy}[i]-H_{yx}[i] \cdot H_{xy}[i]$$

The Square-root-Determinant transfer function, SD[i], can also be calculated. The magnitude of SD[i] is given by |SD[i]|=|D[i]|$^{1/2}$, and its phase is calculated as $$\angle SD[i] = \frac{\angle D[i]}{2}.$$

FIG. 5 illustrates a representative method of performing this calculation. Thus, the determinant D[i] is computed at 48. The phase of the determinant, $\angle D[i]$, can then be obtained, at 50, for example using a look-up table as shown in FIG. 5. Dividing the phase of the determinant $\angle D[i]$ by 2 (at 52) yields the desired phase $\angle SD[i]$.

As may be appreciated, the phase $\angle SD[i]$ computed using this method may have virtually any value. However, any computed value beyond a range of $\pm\pi$ is equivalent to a corresponding value within this range. Accordingly, the computed phase values $\angle SD[i]$ are preferably "unwrapped" to their equivalent true phase value, $\phi[i]$, which lies within the range $(-\pi \leq \phi[i] \leq \pi)$.

Figure 6:
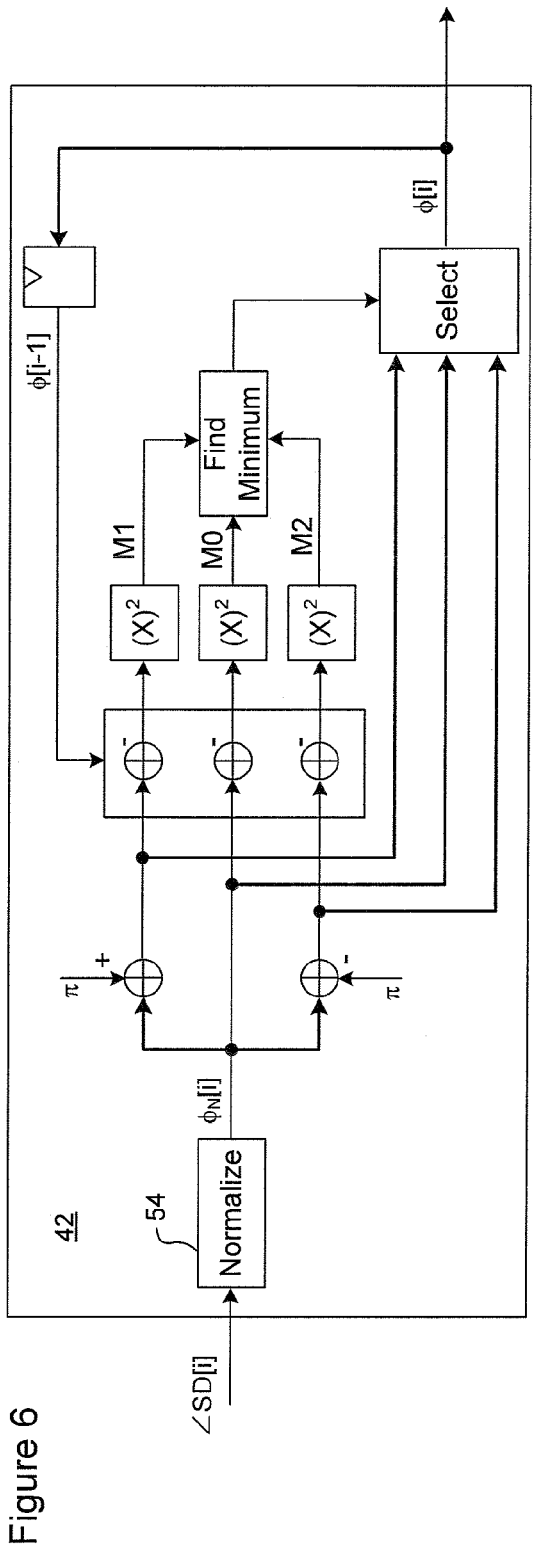
FIG. 6 is a block diagram schematically illustrating principle operations of the phase unwrapping calculation block of FIG. 4.

As may be seen in FIG. 6, one method of unwrapping the computed phase values $\angle SD[i]$ is to normalize the computed phase values $\angle SD[i]$, at 54, such that the normalized phase $\phi_N[i]$ corresponding to the baseband frequency (e.g. frequency, f=0) has a value of zero, and then compute the true phase $\phi[i]$ of each successive frequency bin, above and below the baseband, based on the difference between the normalized phase values of each neighbouring pair of frequency bins. For example, consider an embodiment in which each intermediate vector $\{T^A_X\}$ and $\{T^A_Y\}$ comprises N=256 terms, so i=0 . . . 255. The frequency bins of each intermediate vector $\{T^A_X\}$ and $\{T^A_Y\}$ span a frequency range of $-1/T \ldots +1/T$ (where T is the symbol period) and the center frequency bin (in this case, at i=127) corresponds with the baseband frequency. In this case, the normalized phase $\phi_N[i]$ for each frequency bin (i=0 . . . 255) can be computed as $\phi_N[i]=\angle SD[i]-\angle SD[127]$. The true phase $\phi[i]$ of the baseband frequency bin (i=127) can then be set equal to its normalized phase (thus, $\phi[127]=\phi_N[127]=0$). Then, for positive frequency bins (i=128 . . . 255), the true phase $\phi[i]$ can be found by:

$\phi[i]=\phi_N[i]$ if M0 is minimum $\phi[i]=\phi_N[i]+\pi$ if M1 is minimum $\phi[i]=\phi_N[i]-\pi$ if M2 is minimum where:

$M0=|\phi_N[i]-\phi[i-1]|$ $M1=|\phi_N[i]+\pi-\phi[i-1]|$ $M2=|\phi_N[i]-\pi-\phi[i-1]|$ This operation is schematically illustrated in FIG. 6. For negative frequency bins (i=126 . . . 0), the true phase $\phi[i]$ can be found by:

$\phi[i]=\phi_N[i]$ if M0 is minimum $\phi[i]=\phi_N[i]+\pi$ if M1 is minimum $\phi[i]=\phi_N[i]-\pi$ if M2 is minimum where:

$M0=|\phi_N[i]-\phi[i+1]|$ $M1=|\phi_N[i]+\pi-\phi[i+1]|$ $M2=|\phi_N[i]-\pi-\phi[i+1]|$ The true phase vector $\phi[i]$, i=0 . . . N represents the phase response of SD[i] (with respect to frequency). The linear component of this phase response is the delay compensated by the equalizing coefficients. Accordingly, the delay $\tau_{est}$ can be estimated from a linear fit across the true phase vector $\phi[i]$, i=0 . . . N, using any of a variety of known fitting algorithms.

Figure 7:
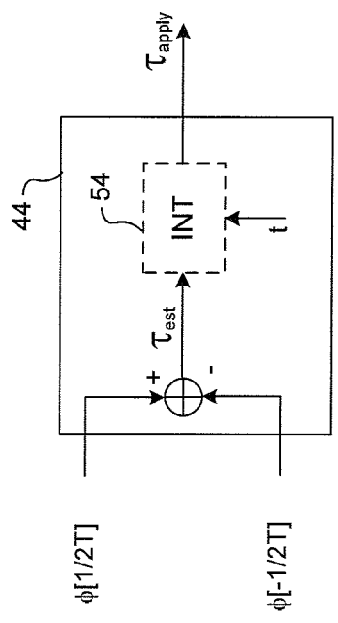
FIG. 7 is a block diagram schematically illustrating principle operations of the delay estimation block of FIG. 4.

FIG. 7 shows an alternative method, in which the delay $\tau_{est}$ is calculated as a fraction of the symbol interval T by subtracting the phase at positive ½ symbol rate from the phase at negative ½ symbol rate. Thus $$\tau_{est} = \left(\phi\left[\frac{-1}{2T}\right]-\phi\left[\frac{+1}{2T}\right]\right)$$

Continuing the above example, the frequency bins corresponding to $+\frac{1}{2}T$ and $-\frac{1}{2}T$ are located at i=191 and i=63, respectively. In this case, $\tau_{est}=(\phi[63]-\phi[191])$.

Cycle slips and framing errors during signal acquisition can appear as a delay in the equalizing coefficients. Left un-checked, this delay can offset the equalizing coefficients to one side, and thus affect their ability to compensate ISI. This problem can be overcome by implementing a secondary loop 54 to low-pass-filter the delay estimate $\tau_{est}$ to yield a channel delay, $\tau_{apply}$, which can be applied to the equalizing coefficients Hxx[i], Hxy[i], Hyy[i] and Hyx[i]. One method of low-pass filtering the delay estimate $\tau_{est}$ is to integrate $\tau_{est}$ over a predetermined period of time (or, equivalently, a predetermined number of successive values). Low-pass filtering $\tau_{est}$ in this manner effectively zeros the delay over time, thereby centering the clock phase estimate and so ensuring optimum performance of the equalizer 14.

Figure 8:
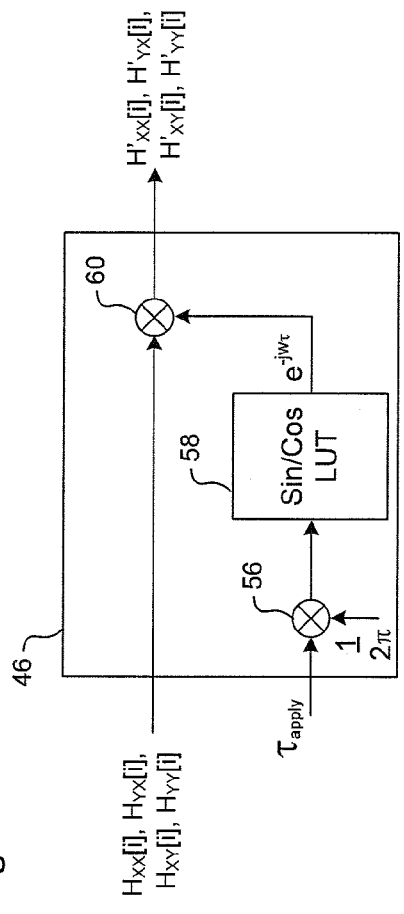
FIG. 8 is a block diagram schematically illustrating principle operations of the delay subtraction block of FIG. 4.

Referring to FIG. 8, the channel delay $\tau_{apply}$ can then be converted into a phase offset $e^{-j\omega\tau}$ (for example via a multiplication block 56 and a look-up table 58) and subtracted from the equalizing coefficients Hxx[i], Hxy[i], Hyy[i] and Hyx[i], at 60, to generate modified coefficients H'xx[i], H'xy[i], H'yy[i] and H'yx[i] that are delay-free, and centered for optimal compensation performance.

Referring back to FIG. 3, the modified coefficients H'xx[i], H'xy[i], H'yy[i] and H'yx[i] can then be supplied to the optimization block 30 of the clock recovery circuit 28. With this arrangement, the phase detector 32 operates on signals that are compensated for ISI except channel delay. On the other hand, the carrier recovery block 24 receives symbol estimates 22 which are compensated for ISI including channel delay. Consequently, the clock recovery digital PLL is decoupled from the LMS adaptation loop.

Those of ordinary skill in the art will recognise that there are alternative ways by which the channel delay $\tau_{apply}$ can be used to decouple the clock recovery digital PLL from the LMS adaptation loop, which are mathematically equivalent to the embodiment described above with reference to FIGS. 3-8. For example, instead of subtracting the channel delay $\tau_{apply}$ from the equalizing coefficients Hxx[i], Hxy[i], Hyy[i] and Hyx[i], at 60 (FIG. 8), a mathematically equivalent alternative is to subtract the channel delay $\tau_{apply}$ from the carrier phase detected by the phase detector 32.

The embodiment(s) of the invention described above is(are) intended to be exemplary only. The scope of the invention is therefore intended to be limited solely by the scope of the appended claims.

We claim:

1. In a coherent optical receiver of an optical communications network, a method of recovering a clock signal from a high speed optical signal received through an optical link, the method comprising steps of:
    adaptively computing a set of compensation vectors for compensating Inter-symbol Interference (ISI) due to at least polarization impairments of the optical signal;
    estimating a channel delay based on the computed compensation vectors;
    subtracting the estimated channel delay from the computed compensation vectors to generate corresponding modified compensation vectors; and
    using the modified compensation vectors to derive a recovered clock signal.

2. The method as claimed in claim 1, wherein each compensation vector comprises a plurality of terms, each term comprising an equalization coefficient for compensating at least polarization impairments within a respective frequency bin, and wherein estimating the channel delay comprises:
    computing a true phase vector comprising a respective true phase term for each frequency bin; and
    computing a channel delay estimate from the true phase vector.

3. The method as claimed in claim 2, wherein computing the true phase vector comprises, for each frequency bin:
    defining a respective equalization coefficient transfer function comprising corresponding equalization coefficients of each of the compensation vectors;
    computing a square-root determinant of the equalization coefficient transfer function;
    determining a phase of the computed square-root determinant; and
    computing the respective true phase value of the frequency bin by using the determined phase relative to a normalized phase of a predetermined baseband frequency bin.

4. The method as claimed in claim 2, wherein computing the channel delay estimate from the true phase vector comprises computing a linear fit across all of the terms of the true phase vector.

5. The method as claimed in claim 2, wherein computing the channel delay estimate from the true phase vector comprises:
    selecting respective true phase values of frequency bins corresponding to $+\frac{1}{2}T$ and $-\frac{1}{2}T$, where T is a period of symbols modulated onto the optical signal; and
    computing the channel delay estimate using the selected true phase values.

6. The method as claimed in claim 5, wherein the channel delay estimate is computed by subtracting the respective true phase value of the frequency bin corresponding to $+\frac{1}{2}T$ from the respective true phase value of the frequency bin corresponding to $-\frac{1}{2}T$.

7. The method as claimed in claim 2, further comprising low-pass filtering the computed channel delay estimate.

8. In a coherent optical receiver of an optical communications network, a processor for recovering a clock signal from a high speed optical signal received through an optical link, the processor comprising:
    means for adaptively computing a set of compensation vectors for compensating Inter-symbol Interference (ISI) due to at least polarization impairments of the optical signal;
    means for estimating a channel delay based on the computed compensation vectors;
    means for subtracting the estimated channel delay from the computed compensation vectors to generate corresponding modified compensation vectors; and
    a clock recovery circuit for deriving a recovered clock signal using the modified compensation vectors.

* * * * *